Dec. 8, 1925.
W. P. McCANDLESS
1,564,485
SWIVEL JOINT FOR TUBES USED FOR CONDUCTING LIQUIDS AND FLUIDS
Filed March 21, 1925
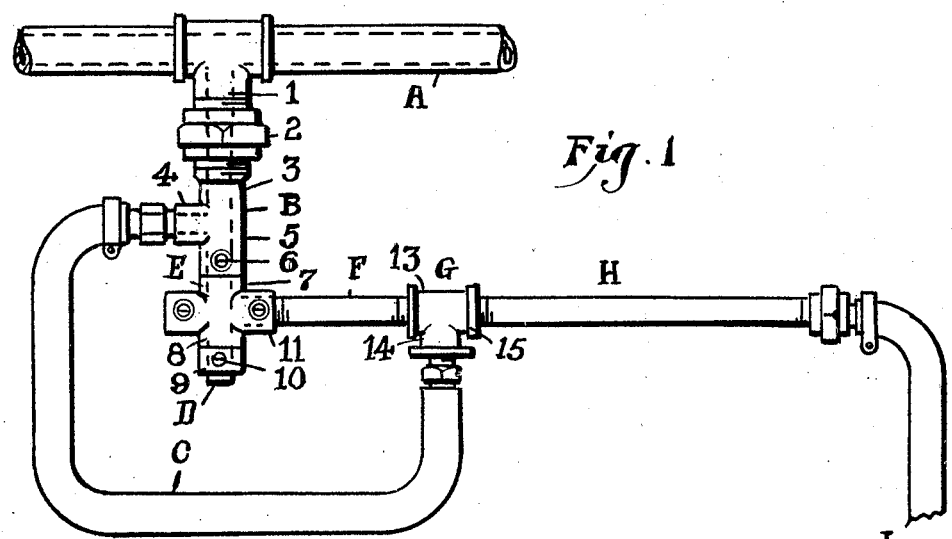
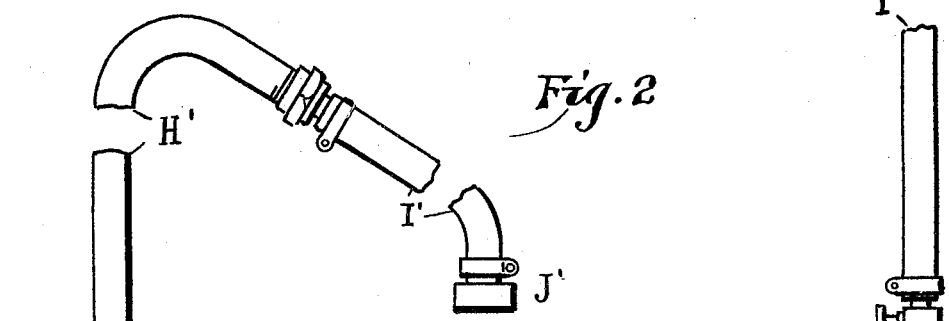
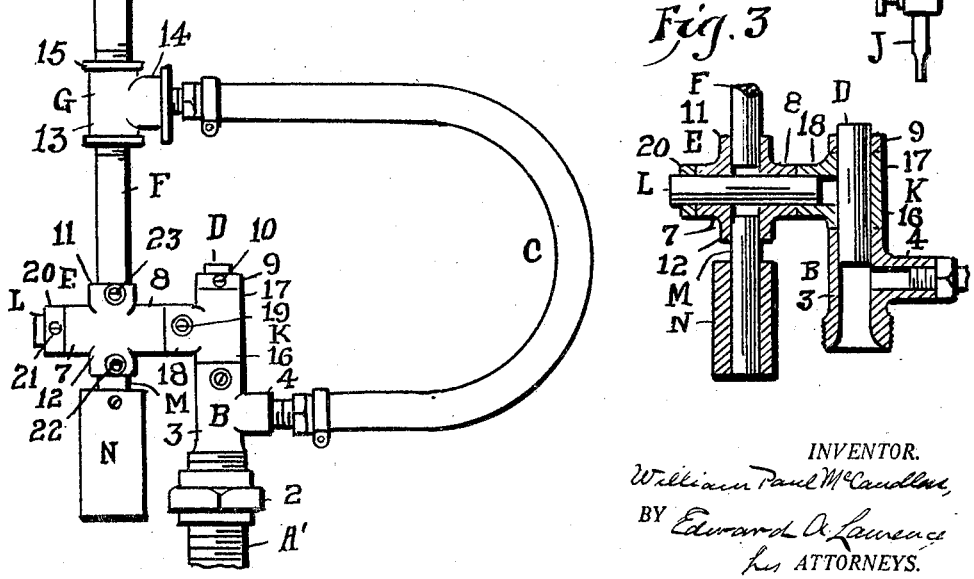
INVENTOR.
William Paul McCandless,
BY Edward A. Lawrence
his ATTORNEYS.

Patented Dec. 8, 1925.

1,564,485

UNITED STATES PATENT OFFICE.

WILLIAM PAUL McCANDLESS, OF PITTSBURGH, PENNSYLVANIA.

SWIVEL JOINT FOR TUBES USED FOR CONDUCTING LIQUIDS AND FLUIDS.

Application filed March 21, 1925. Serial No. 17,255.

*To all whom it may concern:*

Be it known that I, WILLIAM PAUL MC-CANDLESS, a citizen of the United States of America, and a resident of the city of Pittsburgh, county of Allegheny, and State of Pennsylvania, have invented a new and Improved Swivel Joint for Tubes Used for Conducting Liquids and Fluids, of which the following is a specification.

Such devices are employed in many arts. Thus, as one instance, in spray-painting of automobiles, the paint is applied under pressure by means of a spray nozzle, and the nozzle must be carried around the car so as to reach all parts. The same is true in devices for washing automobiles or other objects, for unloading tanks and tank wagons.

Again, as another instance, at garages and service stations, compressed air is furnished for inflating tires, and the delivery tube must be arranged so that the outlet may be applied to the tire valves of the four wheels and also of the spare tires.

Such conducting devices are composed of portions formed of rigid tubing, such as steel piping, while for the dispensing end flexible tubing, such as reinforced rubber hose, is sometimes employed. By providing the metal tubing with an efficient swivel-joint kinking and wearing out of the hose is avoided, and greater facility and convenience in use is obtained.

An important feature is the prevention of leakage and loss of pressure at the swivel-joint.

In the accompanying drawings Fig. 1 is a side elevation showing my invention developed as a simple swivel joint; Fig. 2 is a similar view showing the invention developed as a compound swivel-joint; and Fig. 3 is an enlarged sectional detail of the embodiment shown in Fig. 2.

The following is a detailed description of the drawings, reference being first had to Fig. 1.

A represents the fluid or liquid supply pipe. This supply may be a pressure tank. 1 is a threaded stem or nipple depending from pipe A and to which the T-fitting B is connected as by the coupler 2. The arm 3 of the T-fitting B has its bore connected to the bore of the stem 4 of said fitting. The bore of the arm 5 of the fitting B does not communicate with the bores of the arm 3 and of the stem 4.

A flexible hose C is connected to the stem 4 of the fitting B.

A rod D has its end inserted into the bore of the arm 5 of the fitting B and fixed therein, as by the set screw 6.

E is a fitting, preferably a "cross" fitting which is rotatably mounted on the rod D, which latter extends through the bores of two alined arms of the fitting E, as 7 and 8. The fitting E is held in place on the rod D, as by means of the collar 9 fixed on said rod against the end of the stem 8, as by the set-screw 10.

One of the arms of said fitting E which is disposed at right angles to the axis of rotation, such as the arm 11, has screwed therein the end of a rod F. The other arm 12 of the fitting E, if a cross-fitting be employed, may be plugged, as shown.

On the outer end of the rod F is mounted the T-fitting G. One of the arms 13, of the fitting G is screwed onto the end of the rod F and is thereby plugged.

The other end of the flexible hose C is connected to the stem 14 of the T-fitting G.

One end of an extension pipe H is screwed into the other arm 15 of the fitting G, the said pipe being of sufficient length to provide the desired radius. There is thus open communication between the hose C and the pipe H.

To the outer end of the extension pipe H is connected the flexible delivery hose I whose free end may be provided with a suitable spray-nozzle J.

The simple swivel embodiment of my invention lends itself especially to spray-painting, such as of automobiles. In such cases the supply pipe A may run along under the ceiling, the extension pipe H being horizontally disposed at the proper elevation. The automobile or other object to be painted is positioned under the station of the swivel-joint with the extension pipe extending horizontally from its axis of movement.

The workman, as he moves around the work, by pulling on the hose I, causes the pipe H and the swivel-joint to turn on their vertical axis, so that he is enabled to conveniently reach any part of the work, and thus do the job thoroughly.

Referring now to Figs. 2 and 3, I have shown therein my invention developed as a double-swivel or universal joint which is especially adapted for use in connection with compressed-air delivery stations employed for inflating tires and the like.

In such cases the arm 3 of the T-fitting B is connected, as by the coupler 2, to the upper end of the compressed air supply pipe A' which may extend up through the sidewalk. In this embodiment, the cross-fitting E is not carried directly by the rod D, but the rod D, which here extends upwardly from the T-fitting B, has pivotally mounted thereon a T-fitting K, the rod extending through the alined arms 16 and 17 of the fitting K. The stem 18 of the fitting K has fixed thereon, as by the set screw 19, the rod L which extends through the alined arms 7 and 8 of the fitting E, said fitting being retained on the rod L, as by the collar 20 which is fixed on the end of the rod by the set screw 21.

One of the other pair of alined arms of the cross-fitting E, as 12, has fixed thereon, as by the set screw 22, one end of a short rod M whose other end carries a weight N. The rod F has its one end fixed, as by the set screw 23 in the arm 11 of the fitting E, and the other end of said rod is screwed into the arm 13 of the T-fitting G. The stem 14 of said fitting G is connected to the stem 4 of the T-fitting B by the hose C. The other arm 15 of the T-fitting G has screwed thereon the lower end of the stand pipe H'. The upper end of said stand pipe is curved downwardly and has attached thereto one end of the flexible delivery hose I' provided at its end with the usual spring closed valve J' which is opened by being pressed against the stem of a tire valve.

It is evident that a wide range of movements is provided for in the second embodiment of my invention, the joint being swivelled on both a vertical axis and a horizontal axis. The weight N causes the stand pipe H' to always return to the vertical when released, but permits it to swing readily on its horizontal axis.

My improvement is of simple and inexpensive construction, being capable of assemblage from pipe fittings, pipes, tubes, rods and other elements readily obtainable in the open market. It is compact and thus does not require much space and cannot interfere with its convenient use. It is also durable and efficient, and repairs or replacements may be quickly and cheaply made.

It is evident that my invention may be employed with great advantage in conducting liquids or fluids under any circumstances or conditions.

What I desire to claim is:—

1. In a swivel-joint structure for the purposes described, the combination of a T-fitting in fixed relation to the source of supply of the fluid or liquid to be conducted, said T-fitting being provided with a substantially right-angled passage having its one end in communication with said supply, a second fitting rotatably mounted in relation to said T-fitting and turning on an axis at right angles to the axis of the discharge end of said passage, a second T-fitting carried by said second named fitting but without tubular communication therewith, and a flexible hose connecting the outlet end of the passage of said first named T-fitting with the stem of said second T-fitting.

2. In a swivel-joint structure for the purposes described, the combination of a T-fitting in fixed relation to the source of supply of the fluid or liquid to be conducted, the bore of one arm of said fitting being in communication with said supply and also with the bore of the stem of said fitting, a second fitting carried by said T-fitting and rotatable in relation thereto on an axis coincident with the axis of the arms of said T-fitting and also on an axis at right angles to said first named axis, a second T-fitting mounted to move in unison with the second named fitting, a delivery tube connected to one arm of said second named T-fitting, and a flexible hose connecting the stems of said T fittings.

3. In a swivel-joint structure for the purposes described, the combination of a T-fitting in fixed relation to the source of supply of the fluid or liquid to be conducted, the bore of one arm of said fitting being in communication with said supply and also with the bore of the stem of said fitting, a second fitting carried by said T-fitting and rotatable in relation thereto on an axis coincident with the axis of the arms of said T-fitting and also on an axis at right angles to said first named axis, a second T-fitting mounted to move in unison with the second named fitting, a flexible hose connecting the stems of said T-fittings, and a flexible hose connected to one of the arms of said T-fitting.

4. In a swivel-joint structure for the purposes described, the combination of a T-fitting in fixed relation to the source of supply of the fluid or liquid to be conducted, the bore of one arm of said fitting being in communication with said supply and also with the bore of the stem of said fitting, a second fitting carried by said T-fitting and rotatable in relation thereto on an axis coincident with the axis of the arms of said T-fitting and also on an axis at right angles to said first named axis, a second T-fitting mounted to move in unison with the second named fitting, a flexible hose connecting the stems of the two T-fittings, an extension pipe attached to one of the arms of the second T-fitting, and a flexible hose attached to the other end of said extension pipe.

5. In a swivel-joint structure for the purposes described, the combination of a T-fitting in fixed relation with the source of supply of the fluid or liquid to be conducted, the bore of one arm of said T-fitting being in communication with said source of supply and also with the bore of the stem of said T-fitting, a second fitting mounted in swivelled relation to said T-fitting, a second T-fitting in fixed relation with said second fitting, a flexible hose connecting the stems of said two T-fittings, and a delivery tube connected to one of the arms of said second T-fitting.

6. In a swivel-joint structure for the purposes described, the combination of a T-fitting in fixed relation with the source of supply of the fluid or liquid to be conducted, the bore of one arm of said T-fitting being in communication with said source of supply and also with the bore of the stem of said T-fitting, a second fitting mounted in swivelled relation to said T-fitting and rotating on two axes at right angles to each other, a second T-fitting in fixed relation with said second fitting, a flexible hose connecting the stems of said two T-fittings, and a delivery tube connected to one of the arms of said second T-fitting.

Signed at Pittsburgh, Pa., this 17th day of March, 1925.

WILLIAM PAUL McCANDLESS.